(No Model.)
D. G. ZEIGLER & R. COPES.
HOEING MACHINE.
No. 338,130. Patented Mar. 16, 1886.
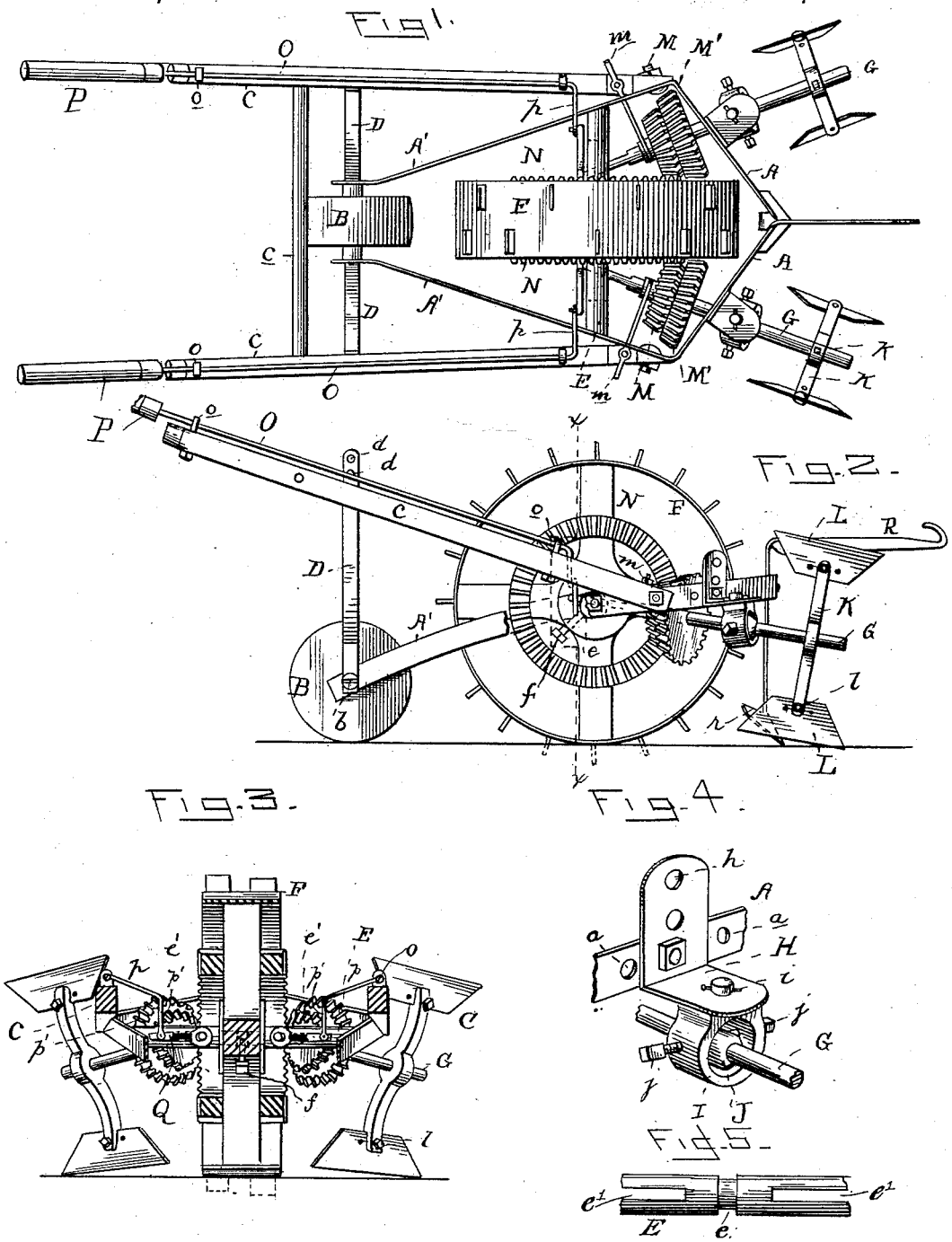
WITNESSES:
Norris A. Clark
R. W. Bishop.
INVENTORS,
Daniel G. Zeigler
Robert Copes
By R.S. & A.P. Lacey Attys

# UNITED STATES PATENT OFFICE.

DANIEL G. ZEIGLER AND ROBERT COPES, OF ORANGEBURG, S. C.

HOEING-MACHINE.

SPECIFICATION forming part of Letters Patent No. 338,130, dated March 16, 1886.

Application filed December 30, 1885. Serial No. 187,135. (No model.)

*To all whom it may concern:*

Be it known that we, DANIEL G. ZEIGLER and ROBERT COPES, citizens of the United States, residing at Orangeburg, in the county of Orangeburg and State of South Carolina, have invented certain new and useful Improvements in Hoeing-Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of agricultural implements commonly termed "cotton-choppers," and designed to be used in thinning out cotton or plants which have been sown in rows or drilled.

The invention consists in the novel features of construction whereby the hoe-shaft is thrown into and out of gear with the drive-wheel, and is adapted to have a vertical and lateral adjustment to regulate its position according to the height of the drill and the distance between the rows.

It also consists in the details of construction, as shown, and in the combination of parts more particularly hereinafter referred to, and pointed out in the claims.

In the drawings, Figure 1 is a plan view of a machine constructed according to and embodying our invention. Fig. 2 is a side elevation, parts being broken away. Fig. 3 is a section on the line X X of Fig. 2, with portions of the hoe-shaft-operating mechanism broken away. Fig. 4 is a perspective detail view of a portion of the frame and hoe-shaft, showing the adjustable and universal bearing-support for the front end of the hoe-shaft. Fig. 5 is a detail of the axle to show the circumferential groove therein.

The frame of the machine is preferably made of bar-iron bent at its middle, forming divergent branches A, which at a suitable distance are bent inward, forming converging limbs A', which are slightly curved downward near their rear ends, and are united by a bolt, *b*, passing through the hub of and forming the axle for a gage-wheel, B. Side bars, C, are pivotally attached at their forward ends to the frame near the point of deflection between the parts A A', and extend rearwardly a proper distance, and are united by a stay-bar, *c*. Braces D depend from the side bars and project, one on each side of the gage-wheel, their lower ends being connected by the bolt *b*. The upper ends of the braces have a series of perforations, *d*, by which they are adjustably connected to the side bars, to regulate the height of the machine to suit persons of different stature. A cross-bar, E, spanning the parts A' of the frame, supports the latter on the traction-wheel F, which turns loosely thereon.

To prevent longitudinal movement of the wheel on the cross-bar, a set-screw, *f*, passes through the hub into an annular groove, *e*, in the bar, as clearly shown in Fig. 2. The cross-bar on each side of the wheel is longitudinally slotted in a horizontal plane, as at *e'*, to admit of the passage of the reduced ends of the hoe-shafts G, set at an incline to the draft of the machine and to each other. The forward ends of the hoe-shafts are supported in universal bearings pendent from brackets H, the vertical extension of which has a series of apertures, *h*, by which they are vertically adjustable on the parts A of the frame, having openings *a*, to effect a longitudinal adjustment for the purpose presently made known.

The universal bearings comprise an outer support, I, having a shank which, passing through an opening in the horizontal arm of the bracket, is held therein by a keeper or pin, *i*, and a sleeve, J, mounted within the support I on set-screws *j*. A bar, K, is mounted on the forward end of the hoe-shaft, and is secured by a set-screw, *k*. The outer ends of this bar are split, and blades L are set therein and held by a set-screw, *l*. These blades have their position made adjustable, so as to present more or less surface to the ground. Speed gear-wheels M M' are mounted on the hoe-shafts, and are keyed to revolve therewith, but have a longitudinal adjustment thereon to bring either gear-wheel M M' in mesh with a toothed ring, N, secured on each side of the drive-wheel F. A lever, *m*, pivoted to the frame, one on each side, engages an annular grooved projection of the speed-gears, to adjust them longitudinally and bring the proper one in position, according to the thinning out to be attained. Rods O are held to the side bars by keepers *o* in such manner as to have a partial rotary movement therein. The rear ends of these rods are provided with handles P, and their forward ends are bent at right angles, as at *p*, and thence downward, as at *p'*. The free ends of the extensions *p'* are adjustably connected to the hoe-shafts projecting through the slots *e'* by links Q. The rods O are so disposed that a partial rotary movement thereof will, through the connections just described, advance or retract the rear ends of the hoe-shafts to or from the drive-wheel, thereby throwing the same in or out of gear as the occasion may require. By reason of the universal bearing provision is made for such vibratory motion of the hoe-shafts as is manifest.

As the handles P serve as a means for the operator to govern the movements of the implement, and also as a means to throw the operating parts into and out of gear, it is apparent that the machine is wholly under the control of the operator, and at a moment's notice can be thrown into or out of action.

The rods O are adjustably connected to the hoe-shafts, to permit the adjustment of the speed-gears, and at the same time provide for the shifting in and out of gear of the hoe-shafts with the drive-wheel.

A combined hook and clearer, R, is attached to the forward end of the frame.

The hook affords a means of hitching the machine to a suitable draft power.

The clearer *r* removes all obstacles from the path of the drive-wheel, and, if necessary, may be made to cultivate the plants.

Having thus described our invention, what we claim, and desire to secure by Letters Patent, is—

1. The combination of the frame, the cross-bar E, drive-wheel F, loosely mounted on the cross-bar, a hoe-shaft having its end passed through a longitudinal slot in the cross-bar to one side of the drive-wheel, a universal bearing for the opposite end of the hoe-shaft, and means to move said end of the hoe-shaft in the slot in the cross-bar, whereby said shaft may be thrown in and out of gear with the drive-wheel as desired, substantially as set forth.

2. The combination of the frame, side bars, rods mounted in keepers on the side bars and free to partially rotate therein, hoe-shafts mounted in universal bearings and driven from the traction-wheel by intermeshing gearings, and links connecting the hoe-shafts with the rods, whereby a partial turn of either of the rods will throw the corresponding hoe-shaft out of gear with the drive-wheel, substantially as and for the purposes set forth.

3. The combination of the frame, side bars, cross-bar, drive-wheel loosely mounted on the cross-bar, hoe-shafts mounted on each side of the drive-wheel in universal bearings, with their inner ends passed through slots in the cross-bar, gearing connecting the hoe-shaft and drive-wheel, rods mounted on the side bars and adjustably connected with the hoe-shafts, whereby the shaft may be thrown in and out of gear as desired, substantially as and for the purpose specified.

In testimony whereof we affix our signatures in presence of two witnesses.

DANIEL G. ZEIGLER.
ROBERT COPES.

Witnesses:
WM. L. GLAZER,
J. C. PIKE.